United States Patent
Goergen et al.

(10) Patent No.: US 12,481,158 B2
(45) Date of Patent: Nov. 25, 2025

(54) FRONT AND PERIPHERAL VIEW LENS AREAS FOR VIRTUAL REALITY HEADSETS

(71) Applicant: Universal City Studios LLC, Universal City, CA (US)

(72) Inventors: Patrick John Goergen, Orlando, FL (US); Martin Evan Graham, Clermont, FL (US)

(73) Assignee: Universal City Studios LLC, Universal City, CA (US)

( * ) Notice: Subject to any disclaimer, the term of this patent is extended or adjusted under 35 U.S.C. 154(b) by 654 days.

(21) Appl. No.: 17/742,214

(22) Filed: May 11, 2022

(65) Prior Publication Data

US 2022/0365349 A1 Nov. 17, 2022

Related U.S. Application Data

(60) Provisional application No. 63/242,115, filed on Sep. 9, 2021, provisional application No. 63/189,051, filed on May 14, 2021.

(51) Int. Cl.
G02B 27/01 (2006.01)
(52) U.S. Cl.
CPC .. *G02B 27/0172* (2013.01); *G02B 2027/0147* (2013.01); *G02B 2027/0178* (2013.01)
(58) Field of Classification Search
None
See application file for complete search history.

(56) References Cited

U.S. PATENT DOCUMENTS

| | | |
|---|---|---|
| 5,274,405 A | 12/1993 | Webster |
| 9,626,936 B2 | 4/2017 | Bell |
| 9,905,052 B2 | 2/2018 | Lindeman |
| 10,175,487 B2 | 1/2019 | Benko et al. |
| 11,036,055 B2 | 6/2021 | Ninan et al. |
| 2012/0068913 A1 | 3/2012 | Bar-Zeev et al. |
| 2017/0039766 A1 | 2/2017 | Passmore et al. |
| 2017/0285344 A1* | 10/2017 | Benko ............... G06T 19/006 |
| 2017/0352178 A1* | 12/2017 | Katz ................... G06V 40/168 |
| 2019/0026871 A1 | 1/2019 | Han et al. |

(Continued)

OTHER PUBLICATIONS

Optoslon "Virtual Reality Headset, 3D VR Glasses for Mobile Games and Movies, Compatible 4.7-6.2 inch iPhone/Android Phone", available Oct. 19, 2018, https://www.amazon.com/Virtual-Osloon-Headphone-Compatible-Including/dp/B07JKNJNY2, 9 pgs.

(Continued)

*Primary Examiner* — Bao-Luan Q Le
*Assistant Examiner* — Danell L Owens
(74) *Attorney, Agent, or Firm* — Fletcher Yoder, P.C.

(57) ABSTRACT

The present disclosure is directed to a virtual reality headset that includes a primary lens area and a peripheral lens area. The virtual reality headset may also include one or more primary display screens aligned with the primary lens areas and multiple secondary display screens aligned with the peripheral lens areas. The peripheral lens areas may include a semi-transparent texture to distort images viewed through the peripheral lens area to appear as though through a peripheral vision view and to supplement main images viewed through the primary lens area.

20 Claims, 3 Drawing Sheets

(56) References Cited

U.S. PATENT DOCUMENTS

2019/0155037 A1* 5/2019 Matsumura ............ G02B 25/04
2019/0339528 A1   11/2019 Freeman et al.
2019/0349575 A1* 11/2019 Knepper ................ G06F 3/012
2020/0233189 A1*  7/2020 Smith ................ G02B 27/0172

OTHER PUBLICATIONS

PCT/US2022/029024 International Search Report and Written Opinion mailed Aug. 8, 2022.
Xiao et al., "Augmenting the Field-of-View of Head-Mounted Displays with Sparse Peripheral Displays", Augmented AR and VR Experiences, May 7, 2016, pp. 1221-1232, San Jose, CA.
Yamada et al., "Expanding the Field-of-View of Head-Mounted Displays with Peripheral Blurred Image", Research Labs, NTT Docomo, Oct. 16, 2016, pp. 141-142, Japan.
Bastani et al., "Foveated Pipeline for AR/VR Head-Mounted Displays", Frontline Technology, Nov. 1, 2017, pp. 14-19.

* cited by examiner

FRONT AND PERIPHERAL VIEW LENS AREAS FOR VIRTUAL REALITY HEADSETS

CROSS-REFERENCE TO RELATED APPLICATIONS

This application claims priority to and the benefit of U.S. Provisional Application No. 63/242,115, entitled "Front and Peripheral View Lens Areas for Virtual Reality Headsets," filed Sep. 9, 2021, and U.S. Provisional Application No. 63/189,051, entitled "Front and Peripheral View Lens Areas for Virtual Reality Headsets," filed May 14, 2021, both of which are hereby incorporated by reference in their entireties for all purposes.

BACKGROUND

The present disclosure relates generally to the field of virtual reality headsets. More specifically, embodiments of the present disclosure relate to lenses for virtual reality headsets.

A virtual reality headset may include one or more display screens that display images to a user of the virtual reality headset. The displayed images may be viewed through lenses of the virtual reality headset. The virtual reality headset may display the images and/or render special effects to reflect a variety of environments and/or scenarios. For example, the virtual reality headset may display a visual feature along with sound effects that correspond to the visual feature to aide in further immersing the user in a virtual reality environment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a virtual reality headset includes a housing, a primary display screen supported within the housing and configured to display primary images, and a secondary display screen supported within the housing and configured to display secondary images. The virtual reality headset may also include an optical element that includes a primary optical area and a peripheral optical area. Further, the primary optical area enables viewing of main content displayed on the primary display screen and the peripheral optical area enables viewing of secondary content displayed on the secondary display screen.

In addition, in an embodiment, a virtual reality headset includes a housing, a primary display screen supported within the housing and configured to display primary images, and a secondary display screen supported within the housing and configured to display secondary images. Further, the virtual reality headset includes an optical element that includes a primary optical area and a peripheral optical area. The primary optical area is positioned to align with the primary display screen and is transparent, and the peripheral optical area is positioned to align with the secondary display screen and is translucent.

Further, in an embodiment, a method of operating a virtual headset includes displaying primary images on a primary display screen positioned in front of a transparent primary lens area of the virtual reality headset from a perspective of a viewer. The method also includes displaying secondary images on a secondary display screen positioned in front of a translucent peripheral lens area of the virtual reality headset from the perspective of the viewer. The method further includes coordinating, via one or more processors, the displaying of the primary images and the displaying of the secondary images to create a virtual environment with peripheral vision effects.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
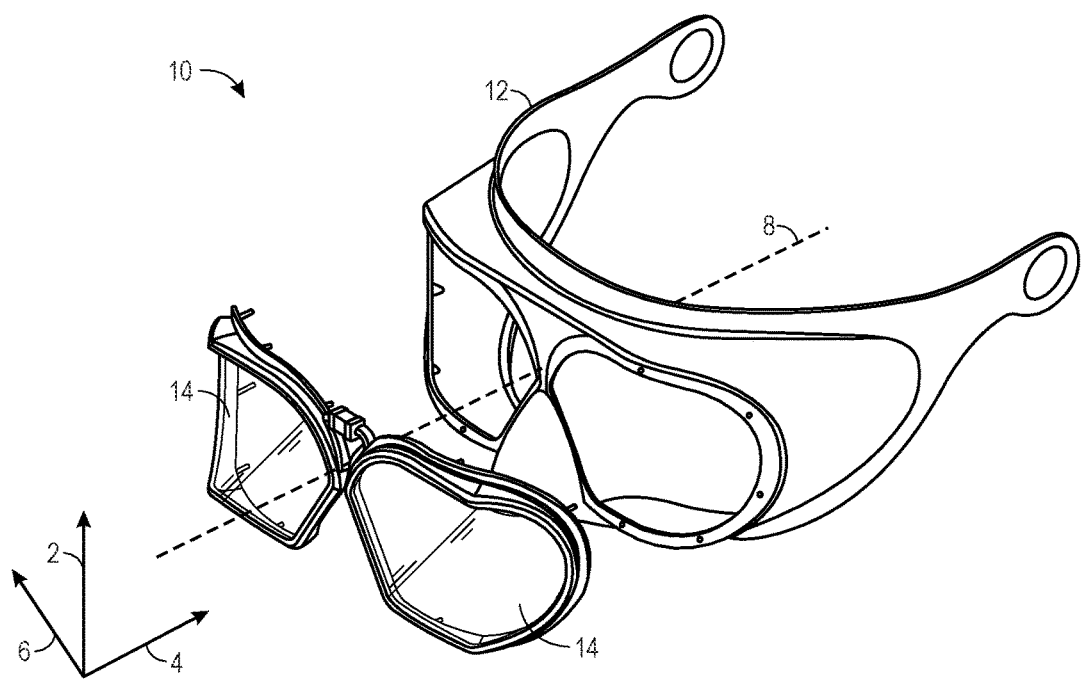
FIG. 1 is a front perspective view of an optical element of a virtual reality headset and a portion of an electrical casing of the virtual reality headset, in accordance with an embodiment of the present disclosure.

Reference will now be made in detail to specific embodiments illustrated in the accompanying drawings and figures. In the following detailed description, numerous specific details are set forth in order to provide a thorough understanding of the disclosure. However, it will be apparent to one of ordinary skill in the art that embodiments may be practiced without these specific details. In other instances, well-known methods, procedures, and components have not been described in detail so as not to unnecessarily obscure aspects of the embodiments.

The terminology used herein is for the purpose of describing particular embodiments only and is not intended to be limiting. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Some existing virtual reality headsets may have one or two lenses that enable viewing an image displayed on a display screen of the virtual reality headset. Advantageously, the present disclosure provides a virtual reality headset with an optical element (e.g., one or more lenses; a lens assembly) that includes a primary lens area (e.g., main lens area; center or forward lens area) of the optical element and a peripheral lens area (e.g., secondary lens area; side lens area) of the optical element. The peripheral lens area of the optical element may be used to provide a peripheral view to the user at various times and/or in certain ways to enable a more immersive experience for the user. For example, the peripheral lens areas of the optical element may enable visualization of additional color effects or other special effects to enhance the user's experience in viewing a main image at the primary lens area of the optical element.

More particularly, provided herein is a virtual reality headset that includes an optical element that enables viewing of content displayed on one or more screens located in the virtual reality headset. The optical element may be partitioned into two areas (e.g., left and right areas; left and right of a centerline). The optical element may include left and right primary lens areas (e.g., a left primary lens area and a right primary lens area), which may each be positioned over a primary display screen (e.g., high-definition display screen) and may enable a main image displayed on the high-definition display screen to be viewed by the user positioning their eyes behind (e.g., looking through) the left and right primary lens area. The optical element may also include left and right peripheral lens areas (e.g., a left peripheral lens area and a right peripheral lens area), which may each be positioned over secondary display screens (e.g., low-definition display screens) and may enable images displayed on the secondary display screens to be viewed by the user (e.g., in their peripheral vision; while looking through the left and right primary lens area).

The left and right peripheral lens area may be formed from frosted glass and/or a semi-transparent material, such that the images viewed through the left and right peripheral lens area may have an appearance (e.g., unfocused, fuzzy) that compares to or is similar to peripheral vision (e.g. when the user views a real-world environment without the virtual reality headset). The left and right peripheral lens area may be formed from a textured material. In an embodiment, the left peripheral lens area may be connected to the left primary lens area via a textured material, and the right peripheral lens area may be connected to the right primary lens area via a textured material. In an embodiment, the transparency may gradually decrease (e.g., via changes in the texture, such as by a surface roughness that provides the texture gradually increasing) from an outer edge of the left primary lens area to an outer edge of the left peripheral lens area and from an outer edge of the right primary lens area to an outer edge of the right peripheral lens area.

While the disclosed embodiments are generally described in the context of virtual reality headsets, it should be understood that the virtual reality headsets, as provided herein, may also be used in other contexts and with other projection and/or viewing systems. For example, the virtual reality headsets may use an external screen or projection component. Additionally, the virtual reality headsets may utilize an external control system that may send commands and/or instructions for the images to be displayed for each virtual reality headset within an environment. Accordingly, the particular construction of the virtual reality headset (e.g., materials, shape, size) may be implemented according to the desired end use.

FIG. 1 is a front perspective view of an optical element 14 (e.g., one or more lenses; a lens assembly) of a virtual reality headset 10 and a portion of an electrical casing 12 (e.g., housing) of the virtual reality headset 10, in accordance with an embodiment of the present disclosure. In one embodiment, the virtual reality headset 10 may include the optical element 14 and the electrical casing 12 that holds the optical element 14. The optical element 14 may be formed from a single material, such as polymethyl methacrylate (PMMA), optically clear material (e.g., with an optical transmittal or light transmission of at least 80 percent, 85 percent, 90 percent, 92 percent, or more), or any other material that includes a suitable refractive index. The optical element 14 may also be formed from multiple different materials, such that different materials form different sections of the optical element 14. The different materials may each take up equal sections of the optical element 14 or variable size sections of the optical element 14. The electrical casing 12 may include or surround multiple electrical components, including one or more display screens, audio elements, special effect elements, controllers, and the like. The electrical casing 12 may contain the optical element 14, and the optical element 14 may be detachable from the electrical casing 12.

The electrical casing 12 may include one or more display screens to display the image (e.g., video feed, picture) that can be viewed through the optical element 14 (e.g., by a user wearing the virtual reality headset 10). The one or more display screens may include a liquid crystal display (LCD), an organic light-emitting diode (OLED) display, or any other suitable display type. The one or more display screens may include a variety of display screen types. For example, one of the display screens may correspond to an LCD display, and another display screen may correspond to an OLED display. Additionally, the one or more display screens may include high-definition display screens and/or low definition display screens. As set forth above, the virtual reality headset 10 may include multiple display screens that may display different images. The optical element 14 may be at least partially translucent in all sections of the optical element 14 (e.g., one or more sections may be transparent or translucent to enable light transmission through the optical element 14; not opaque in any section of the optical element 14). However, it should be understood that the degree to which the material is translucent may vary across the optical element 14. The optical element 14 may also include one or more opaque areas that may coincide with the theme or image viewed through the optical element 14. In this way, the optical element 14 permits the user wearing the virtual reality headset 10 to view the image(s) displayed on the one or more display screens. The optical element 14 may be coupled to the electrical casing 12, but the optical element 14 may also be detachable or removable from the electrical casing 12. To facilitate discussion, the virtual reality headset 10 and its components may be described with reference to a vertical axis or direction 2, a longitudinal axis or direction 4, and/or a lateral axis or direction 6. The virtual reality headset 10 may also have a centerline 8 that extends in the longitudinal direction 4 and separates a left portion and a right portion of the virtual reality headset 10.

Figure 2:
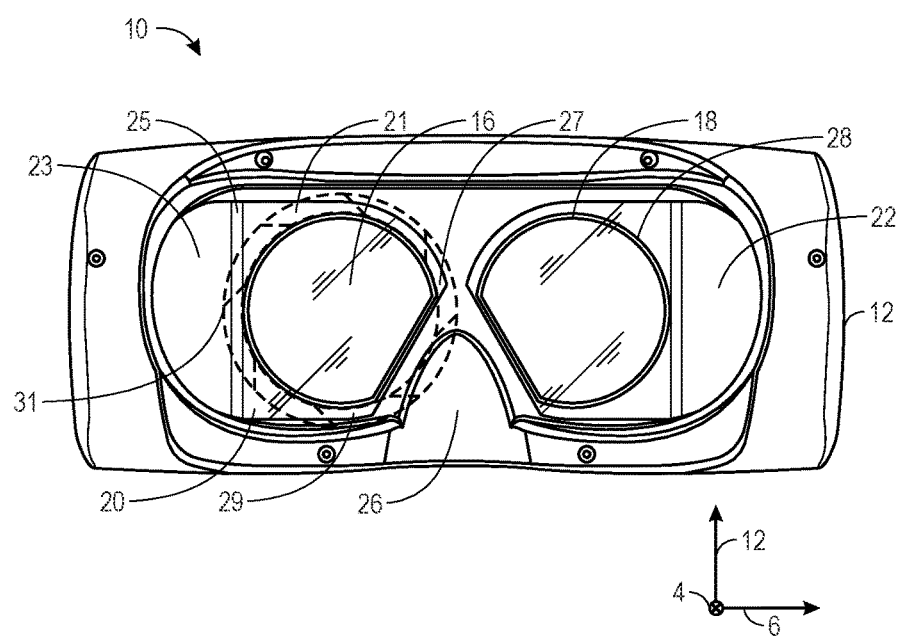
FIG. 2 is a rear view of the virtual reality headset with the optical element that includes a left and right primary lens area and a left and right peripheral lens area, in accordance with an embodiment of the present disclosure.

FIG. 2 is a rear view of the virtual reality headset 10 with the optical element 14 that includes a left and right primary lens areas 16, 18 (e.g., a left/first primary lens area 16 and a right/second primary lens area 18) and a left and right peripheral lens areas 20, 22 (e.g., a left/first peripheral lens area 20 and a right/second peripheral lens area 22), in accordance with an embodiment of the present disclosure. Together, the left and right primary lens areas 16, 18 may be referred to as a primary lens area or a primary optical area. Together, the left and right peripheral lens areas 20, 22 may be referred to as a peripheral lens area or a peripheral optical area. In the illustrated embodiment, the optical element 14 may include the left and right primary lens areas 16, 18 to view main content (e.g., images, videos) and the left and right peripheral lens areas 20, 22 to view peripheral image effects and/or additional special effects that enhance the immersive nature of the main content. The additional special effects may include non-visual special effects, including but not limited to wind effects, sound effects, vibration effects, scent emitting effects, haptic effects, and the like. The left primary lens area 16 may be disposed on a first lateral side (e.g., left side) of the virtual reality headset 10 and the right primary lens area 18 may be disposed on a second lateral side (e.g., right side) of the virtual reality headset 10. The left and right primary lens areas 16, 18 may be shaped to form a notched component 26 (e.g., gap) of the virtual reality headset 10 that may be fitted to a nose of the user. It should be understood that the left and right primary lens areas 16, 18 may be any suitable shape and/or have any configuration to correspond to a desired overall design for the virtual reality headset 10. The left and right primary lens areas 16, 18 may be positioned on the virtual reality headset 10 to correspond to and be in front of a left eye and a right eye of the user while the user wears the virtual reality headset 10. The left primary lens area 16 may be separate from the right primary lens area (e.g., physically separate) and/or may be divided by a portion of the electrical casing 12 (e.g., that defines the notched component 26) of the virtual reality headset 10.

A textured edge 28 may be present about all or some of respective circumferences of the left and right primary lens areas 16, 18. For example, the textured edge 28 may transition the left primary lens areas 16 to the left peripheral lens area 20 and the right primary lens area 18 to the right peripheral lens area 22 The textured edge 28 that surrounds the left primary lens area 16 may be separate from the textured edge 28 that surrounds the right primary lens area 18. The textured edge 28 may also include one or more embedded sensors that may detect a location of the virtual reality headset 10, or be used to collect additional data on the virtual reality headset 10. In an embodiment, the left and right primary lens areas 16, 18 may be formed from a transparent material, the left and right peripheral lens areas 20, 22 may be formed from a translucent material, and the textured edge 28 may be positioned between the transparent material and the translucent material. The textured edge 28 may have a surface roughness that is greater than the surface roughness of the left and right primary lens areas 16, 18 and/or the surface roughness of the left and right peripheral lens areas 20, 22. For example, the textured edge 28 may have texture that is visible and/or detectable by touch, while the left and right primary lens areas 16, 18 and/or the left and right peripheral lens areas 20, 22 may not have any texture that is visible and/or detectable by touch (e.g., smooth surfaces). As another example, the textured edge 28 may have texture that is visible and/or detectable by touch, and the left and right peripheral lens areas 20, 22 may also have texture that is visible and/or detectable by touch; however, the surface roughness of the textured edge 28 may be greater than the surface roughness of the left and right peripheral lens areas 20, 22. In an embodiment, the surface roughness of the textured edge 28 may be less than the surface roughness of the left and right peripheral lens areas 20, 22. More generally, in an embodiment, characteristics of the texture of the textured edge 28 may be different from characteristics of the texture of the left and right peripheral lens areas 20, 22. Thus, the textured edge 28 may be considered distinct from the left and right peripheral lens areas 20, 22 even though texture is present in these sections of the optical element 14. It should be appreciated that the textured edge 28 is an optional feature and may be omitted. Instead, the left and right primary lens areas 16, 18 may transition to the left and right peripheral lens areas 20, 22 without any distinct intermediate section (e.g., having different characteristics; without the textured edge 28). The left and right peripheral lens areas 20, 22 may each include the same or varied surface roughness compared to the textured edge 28. For example, the left peripheral lens area 20 may have a greater surface roughness than the right peripheral lens area 22.

The left and right primary lens areas 16, 18 may enable the user to view an image displayed on a primary screen located in the virtual reality headset 10. It should be understood that the left primary lens area 16 may enable viewing of different content than the right primary lens area 18 based on the image displayed by the virtual reality headset 10. For example, a portion of the image that is exposed to the left primary lens area 16 may be different from a portion of the image that is exposed to the right primary lens areas 16. As shown, the left primary lens area 16 may be associated with a respective non-transparent divider 31 (e.g., having a cone or funnel shape) that extends toward the primary screen to limit viewing of the main content to the left primary lens area 16. While only the non-transparent divider 31 for the left primary lens area 16 is shown in FIG. 2 for image clarity, it should be appreciated that the right primary lens area 18 may also be associated with a respective non-transparent divider that has the same features. As discussed above, the left and right primary lens areas 16, 18 may be formed from PMMA or another optically clear material. Furthermore, the left and right primary lens areas 16, 18 may be formed from separate pieces of material and may be held in appropriate relative positions via the electrical casing 12 or other frame structure, or the left and right primary lens areas 16, 18 may be formed from a single piece of material (e.g., one-piece construction).

As noted, the textured edge 28 may be present around all or some of the circumference of the left primary lens area 16 and also present around all or some of the circumference of the right primary lens area 18. For example, the textured edge 28 may form a gradient texture that transitions to a solid uniform texture that extends across the left peripheral lens area 20 and the right peripheral lens area 22. The left and right peripheral lens areas 20, 22 may have less opacity (e.g., less transparent) than the left and right primary lens areas 16, 18. This may enable the images viewed through the left and right peripheral lens areas 20, 22 to appear blurred in a manner that corresponds to a peripheral vision viewpoint. As discussed above, the left and right peripheral lens areas 20, 22 may be formed from frosted glass or another semi-transparent material. The semi-transparent material may be a plastic material, fabric material, or any suitable lens material that is configured to be positioned in front of eyes of the user to be within and/or affect a view of the user, allow light to pass through the material, and/or to enable the user to view images and/or objects through the material. Indeed, the term "lens area" refers to any part that is configured to be positioned in front of eyes of the user to be within and/or affect a view of the user, allow light to pass through the material, and/or to enable the user to view images and/or objects through the material. The left and right primary lens areas 16, 18 and the left and right peripheral lens areas 20, 22 may be formed from the same material (e.g., PMMA or other optically clear material), but the left and right peripheral lens areas 20, 22 may be treated to make the left and right peripheral lens areas 20, 22 have a greater opacity than the left and right primary lens areas 16, 18. For example, the left and right peripheral lens areas 20, 22 may be texturized (e.g., via etching) and/or coated (e.g., via paint). In such cases, the left primary lens area 16 and the left peripheral lens area 20 may be formed from a single piece of material (e.g., one-piece construction) and the right primary lens area 18 and the right peripheral lens area 22 may be formed from a single piece of material (e.g., one-piece construction). In an embodiment, the left and right primary lens areas 16, 18 and the left and right peripheral lens areas 20, 22 may be formed from a single piece of material (e.g., one-piece construction). However, it should be appreciated that the left and right peripheral lens areas 20, 22 may be formed from separate pieces of material (e.g., separate from one another and separate from the left and right primary lens areas 16, 18) and may be held in appropriate relative positions via the electrical casing 12 or other frame structure.

In an embodiment, each of the left and right peripheral lens areas 20, 22 may be formed from multiple materials that correspond to sections of each of the left and right peripheral lens areas 20, 22. For example, each of the left and right peripheral lens areas 20, 22 may include a greater opacity outer edge (e.g., formed by a strip of black plastic or paint) and a lesser opacity inner edge (e.g., formed by a strip of blended plastic or paint) near the left primary lens area 16 for the left peripheral lens area 20 and the right primary lens area 18 for the right peripheral lens area 22. An opacity may vary between the greater opacity outer edge and the lesser opacity inner edge. For example, the opacity may transition gradually between the greater opacity outer edge and the lesser opacity inner edge. This may cause the color effects displayed on the secondary screens to be viewed through the left and right peripheral lens areas 20, 22 with light and/or color similar to peripheral vision.

The left and right primary lens areas 16, 18 may each have a generally circular shape (e.g., with a curved edge), although the left and right primary lens areas 16, 18 may each have a straight edge along the notched components 26. The left and right primary lens areas 16, 18 may also include a curved edge rather that a straight edge along the notched components 26, or any other suitable edge shape to correspond to the notched components 26. The left and right peripheral lens areas 20, 22 may each have a laterally-extending portion and a longitudinally-extending portion. For example, with reference to the left peripheral lens area 20 shown in FIG. 2, the left peripheral lens area 20 includes a laterally-extending portion 21 (e.g., in a same plane as the left primary lens area 16) and a longitudinally-extending portion 23 that are joined together via a bend portion 25. The laterally-extending portion 21 and the longitudinally-extending portion 23 may be oriented at any suitable angle relative to one another, such as an angle between 60 to 120 degrees, 70 to 110 degrees, or 80 to 100 degrees. In an embodiment, the laterally-extending portion 21 may extend from a first central portion 27 to a second central portion 29 to wrap around the left primary lens area 16. The right peripheral lens area 22 may have the same features. It should be appreciated that the various portions of the left and right peripheral lens areas 20, 22 may have the same or different characteristics. For example, the laterally-extending portion 21 and the longitudinally-extending portion 23 may have different opacities (e.g., due to different textures, coatings, or base materials). In an embodiment, the left and right peripheral lens areas 20, 22 may not include any laterally-extending portions, but instead may only include the longitudinally-extending portions. For example, the left and right primary lens areas 16, 18 may extend and/or be shaped to extend laterally across the virtual reality headset 10. Thus, it should be appreciated that the left and right peripheral lens areas 20, 22 may have any of a variety of shapes and configurations to accommodate and to work in conjunction with the left and right primary lens areas 16, 18 regardless of the shape and configuration of the left and right primary lens areas 16, 18.

As discussed in more detail below, the virtual reality headset 10 may include one or more primary screens 30 (e.g., main screens; high-definition) located in front of the left and right primary lens areas 16, 18 (e.g. aligned; overlapping from a perspective of the user wearing the virtual reality headset 10) and multiple secondary screens 32 (e.g., low-definition) located in front of the left and right peripheral lens areas 20, 22 (e.g., aligned; overlapping from the perspective of the user wearing the virtual reality headset 10). In particular, at least one of the secondary screens 32 may be located in front of the left peripheral lens area 20 and at least one of the secondary screens 32 may be located in front of the right peripheral lens area 22). The one or more primary screens 30 and the multiple secondary screens 32 may include a variety of display types including a liquid crystal display (LCD), an organic light-emitting diode (OLED) display, or any other suitable display type. For example, one the one or more primary screens 30 may correspond to an LCD display, and the multiple secondary screens 32 may correspond to an OLED display. It should be understood that any suitable combination of display type may be utilized by the one or more primary screens 30 and/or the multiple secondary screens 32. The images displayed on the multiple secondary screens 32 may be coordinated with the image displayed on the one or more primary screens 30. This may enable the content displayed on the multiple secondary screens 32 to enhance content displayed on the one or more primary screens 30. For example, the primary screens 30 may be sent instructions to display a video that displays a character talking about a sunrise and/or pointing to a virtual area that would be out of view in the peripheral vision of the user, and the secondary screens 32 may be sent instructions to display a bright light effect to simulate the sunrise and/or event within the virtual area. It should be appreciated that speakers within the virtual reality headset 10 (and/or within a real-world environment) may provide audio effects that corresponds to the images presented via the virtual reality headset 10.

Figure 3:
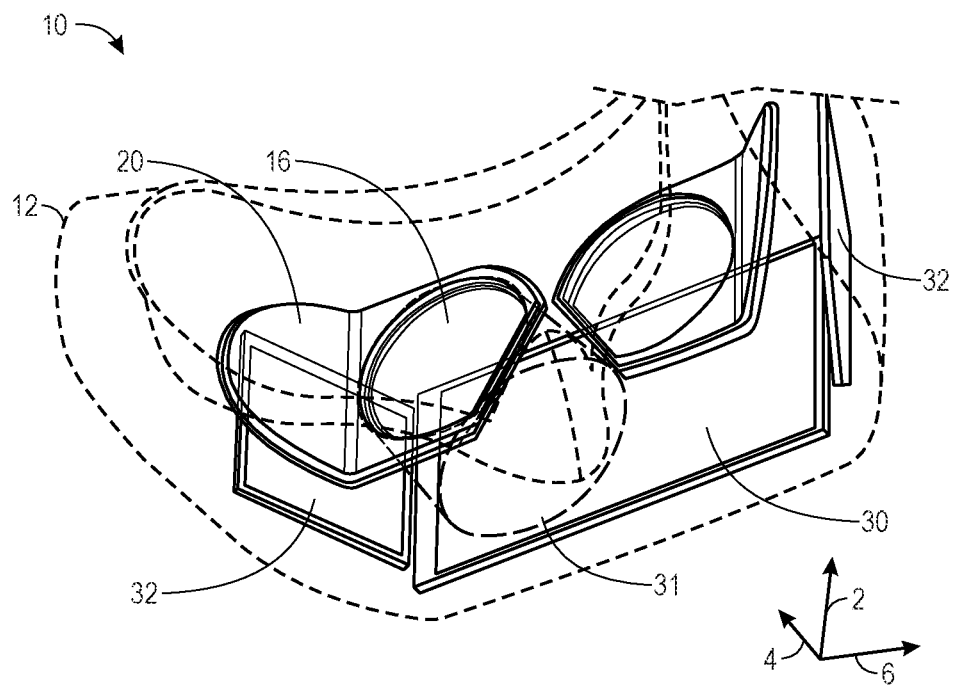
FIG. 3 is a front perspective view of the virtual reality headset with the optical element that includes the left and right primary lens area and the left and right peripheral lens area, wherein certain portions of the virtual reality headset are removed and/or transparent to enable visualization of various features of the virtual reality headset, in accordance with an embodiment of the present disclosure.

With the foregoing in mind, FIG. 3 is a front perspective view of the virtual reality headset 10 with the optical element 14 that includes the left and right primary lens areas 16, 18 and the left and right peripheral lens areas 20, 22, in accordance with an embodiment of the present disclosure. The primary screen 30 can be observed in FIG. 3 as disposed directly in front of the left and right primary lens areas 16, 18. There may be a partition in between the left and right primary lens areas 16, 18 to isolate the content displayed on the left side of the primary screen 30 from the right side of the primary screen 30. The partition may include one or more dividers that extend along the longitudinal axis 4 between the primary screen 30 and the left and right primary lens areas 16, 18. In an embodiment, the partition may include one or more dividers that isolate and/or block light transmission from the primary screen 30 through the left and right peripheral lens areas 20, 22. For example, two cone shape, non-transparent dividers 31 (although only one is shown for image clarity) and/or other shape non-transparent material dividers may connect each of the left and right primary lens areas 16, 18 to the primary screen 30, thus isolating (e.g., completely or substantially) the left and right peripheral lens areas 20, 22 from the primary screen 30. The secondary screens 32 may be located at an angle (e.g., relative to the primary screen 30; to match/align with the left and right peripheral lens areas 20, 22) on the left and right lateral sides of the electrical casing 12 to provide light and special effects for the user to view through the left peripheral lens area 20 over the left secondary screen 32 and through the right peripheral lens area 22 over the right secondary screen 32.

In an embodiment, the virtual reality headset 10 may include three display screens: a single high resolution primary screen 30 to display main content that can be viewed on the left and right primary lens areas 16, 18, and two secondary screens 32 to display special effects or light content that can be viewed on the left peripheral lens area 20 corresponding to the secondary screen on the left and the right peripheral lens area 22 corresponding to the secondary screen 32 on the right. For example, the primary screen 30 may play a video of a sunset that can be viewed through the left and right primary lens areas 16, 18. The secondary screens 32 may display light effects that match the color of the sunset being displayed on the primary screen 30. The light effects of the sunset may be viewed through the left and right peripheral lens areas 20, 22, and may aide in providing an enhanced virtual reality experience for the user. The left secondary screen 32 may also display an image of a sun at a first time that can be viewed through the left peripheral lens area 20. At a later time, the left secondary screen 32 may no longer display an image of the sun and the right secondary screen 32 may display the image of the sun that can be viewed through the right peripheral lens area 22. This may provide the effect of the sun rising on the left and setting on the right via the virtual reality headset 10. It should be understood that different content may be displayed on the secondary screens 32 corresponding to the left peripheral lens area 20 and the right peripheral lens area 22 according to the desired effect. The primary screen 30 and the secondary screen 32 may also form a single display screen (e.g., one piece).

Figure 4:
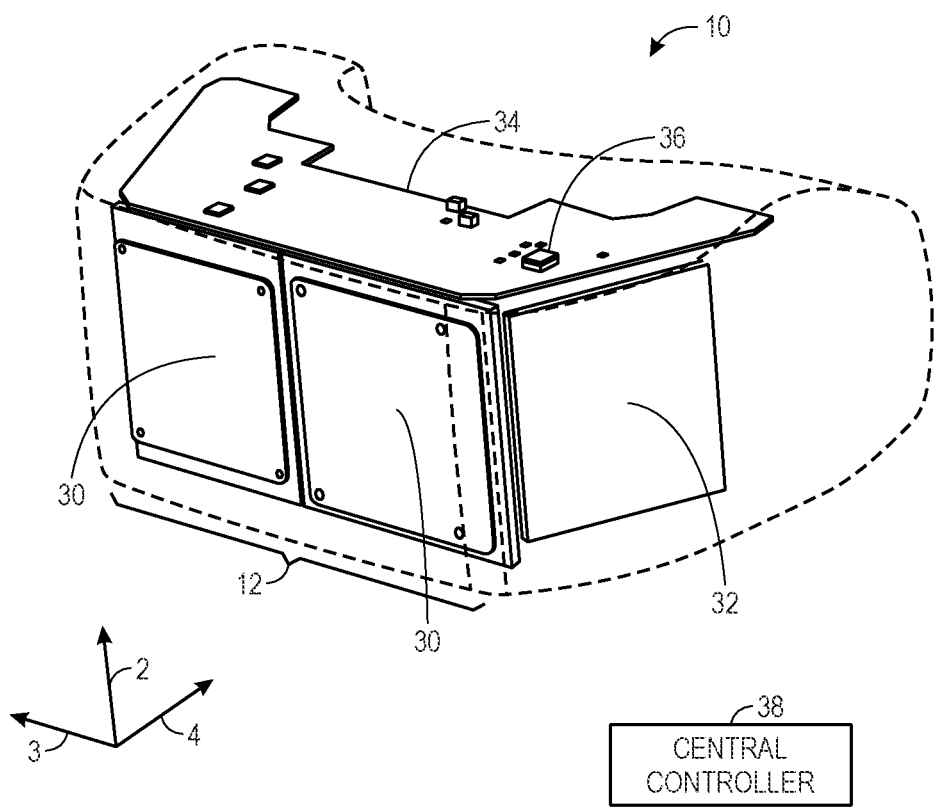
FIG. 4 is a front perspective view of the virtual reality headset, wherein the electrical casing is transparent to enable visualization of various features internal to the electrical casing, in accordance with embodiments of the present disclosure.

With the above understanding of the operation and features of the optical element 14 and screens 30, 32 in mind, discussion herein of the electrical components of the electrical casing 12 may be better understood. FIG. 4 is a front perspective view of the virtual reality headset 10, in accordance with an embodiment of the present disclosure. The electrical components of the electrical casing 12 may include the one or more primary screens 30 and the multiple secondary screens 32. In an embodiment, a top of the electrical casing 12 may include or surround one or more driver boards 34 and a controller 36 (e.g., electronic controller) that may be used to send instructions corresponding to images to be displayed on the primary screen 30 and/or the secondary screens 32 of the virtual reality headset 10. The controller 36 may include one or more processors and may be disposed in the top of the electrical casing 12 and/or may be separate from the virtual reality headset 10 such that a central controller 38, described in more detail below, may function to transmit or send commands to the virtual reality headset 10 to display images according to desired effects. Additionally, the controller 36 may be able to generate peripheral display content corresponding to the secondary screens 32 based on primary display content received from an external controller or processor to be displayed on the primary screen 30.

The controller 36 may function to send commands to the primary screen 30 and/or the secondary screens 32 of the virtual reality headset 10 to display images. The controller 36 may send different image commands to each display screen of the virtual reality headset 10. For example, the controller 36 may send a command to the primary screen 30 to display a main image and/or a main video feed. The controller 36 may then send a different peripheral image and/or effect to each of the secondary screens 32 located on each side of the virtual reality headset 10. In an embodiment, the primary screen 30 may be sent a command via the controller 36 to display a dark alley or important video message that corresponds to a main focus on the primary screen 30. In this instance, the controller 36 may not send any command to project images on the secondary screens 32 so that the focus will be directed on the main image displayed on the primary screen 30. In other instances, the main effect may be a beach scenery and the controller 36 may send a command to the primary screen 30 to display a beach image, and may send a command to the secondary screens 32 to display a bright light effect or display a beach image or other corresponding effect (e.g., bright light to represent the sun) on each of the secondary screens 32. Thus, it should be appreciated that the primary screen 30 and the secondary screens 32 may display a similar image (e.g., similar quality and/or imagery, such as ocean, sand, and sky in the beach image) and the characteristics of the left and right peripheral lens areas 20, 22 (e.g., the texture or the opacity) may alter the transmission of light to simulate peripheral vision and/or the primary screen 30 and the secondary screens 32 may display different images (e.g., different quality and/or imagery, such as the ocean, sand, and sky in high-definition on the primary screen 30 and soft blue and yellow colors across the secondary screens 32) to simulate peripheral vision. In this way the controller 36 may function to send image commands to the primary screen 30 and/or secondary screens 32 based on the desired image and effect to be displayed on the virtual reality headset 10.

In an embodiment, a central controller 38 (e.g., electronic controller) that is separate from the virtual reality headset 10 may function to send instructions to one or more virtual reality headsets 10 within an environment. This may enable the central controller 38 to transmit instructions corresponding to the same image to multiple virtual reality headsets 10 within an environment. For example, multiple users may be within the environment, and the central controller 38 may transmit instructions to display the same image on the primary screen 30 of each virtual reality headset 10. The central controller 38 may also send instructions to display an image and/or effect on the secondary screens 32 of each virtual reality headset 10. Further, the controller 36 may be able to display secondary content on the secondary screens 32 based on the instructions associated with primary content received from the central controller 38. For example, the controller 36 may select or determine that a certain video or image is to be displayed on the primary screen 30, and also send instructions to the secondary screens 32 to display a complementary image or effect based on the received instructions from the central controller 38. This may enable a cohesive experience for multiple users within the environment. The central controller 38 may also function to send unique instructions to each virtual reality headset 10 within the environment. This may enable each virtual reality headset 10 to display different images on the primary screen 30 and/or secondary screens 32. This may enable each user to have a unique experience within the environment, while also offloading image processing to the central controller 38 within the environment.

As discussed herein, the left and right peripheral lens 20, 22 may be treated to enable the left and right peripheral lens 20, 22 to simulate peripheral vision. In an embodiment, all or some portions of the left and right peripheral lens areas 20, 22 may include a film that may be electrically activated. The opacity of the film may vary based on an electrical current that is applied to the film. The film may be layered on top of electrical wiring that allows the electrical current to be sent through the film to provide a level of opacity desired for the left and right peripheral lens areas 20, 22. It should be understood that the film may be used in combination with other techniques, such as a translucent base material, a frosted base material, flexible and/or non-flexible material, and/or a textured based material. It should also be understood that the left peripheral lens area 20 may be sent a different current than the right peripheral lens area 22, such that each of the left and right peripheral lens areas 20, 22 may have the same or different opacity.

The virtual reality headset 10 may include various other features. For example, in an embodiment, the electrical casing 12 may include a game engine that includes a camera view that enables an image to be rendered by utilizing a virtual camera. The game engine may include a processor and software that includes a distortion algorithm to alter the images projected on the secondary screens 32 to not distract from the main content, while still providing enhanced light and image effects to mimic peripheral field of vision. It should also be appreciated that the secondary screens 32 may be replaced or supplemented with one or more light emitters (e.g., light emitting diodes [LEDs]) to provide additional visual effects that are visible through the left and right peripheral lens areas 20, 22 in a low-cost, compact form. In such cases, the one or more light emitters may be illuminated in coordination with the images on the primary screen 30, such as to provide different colors and/or brightness to simulate peripheral vision.

Figure 5:
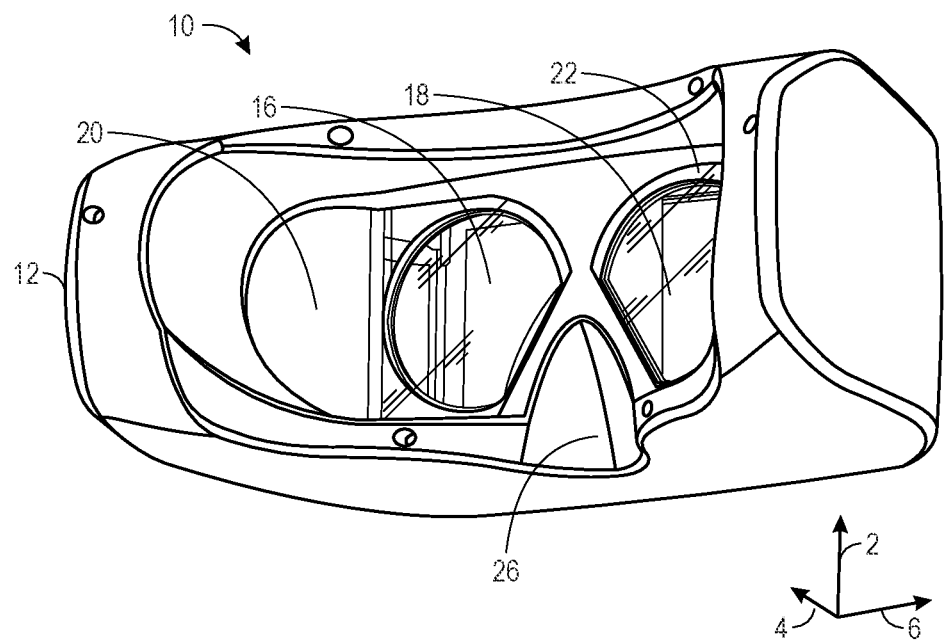
FIG. 5 is a rear perspective view of the virtual reality headset, in accordance with embodiments of the present disclosure.

FIG. 5 is a rear perspective view of the virtual reality headset 10 with the optical element 14, in accordance with an embodiment of the present disclosure. As discussed above, the left and right peripheral lens areas 20, 22 may include a semi-transparent material that connects to (e.g., abuts, surrounds) the left and right primary lens areas 16, 18. While the left and right peripheral lens areas 20, 22 may generally be isolated from the primary screen 30 that is positioned in front of the left and right primary lens areas 16, 18, some of the light from the primary screen 30 may diffuse into the left and right peripheral lens areas 20, 22 (e.g., due to the connection between the left and right peripheral lens areas 20, 22 and the left and right primary lens areas 16, 18).

The electrical casing 12 may also include and/or support a speaker to aide in sound effects to enhance the virtual reality experience and to correspond to images displayed on the primary screen 30. For example, the primary screen 30 may display a campfire, and the speaker may play a cracking sound effect to mimic the sound of the firewood burning. The components of the virtual reality headset 10 may also include other haptic, sound, light, wind, and/or other special effect components to supplement the main image and aide in the immersive experience for the user. This may work in combination with the left and right peripheral lens areas 20, 22 that enable the viewer to view enhanced light effects and/or other display elements that may further the immersive experience by expanding the user's viewpoint past the left and right primary lens areas 16, 18. As discussed herein, the left primary lens area 16 and the left peripheral lens area 20 may be a one-piece structure and/or may be coupled together (e.g., via adhesive and/or welds) to form a single lens structure (e.g., gaplessly continuous), and the left primary lens area 16 and the left peripheral lens area 20 may be distinguished from one another due to differences in transparency, texture, and/or location/display alignment. Similarly, the right primary lens area 18 and the right peripheral lens area 22 may be a one-piece structure and/or coupled together (e.g., via adhesive and/or welds) to form a single lens structure (e.g., gaplessly continuous), and the right primary lens area 18 and the right peripheral lens area 22 may be distinguished from one another due to differences in transparency, texture, and/or location/display alignment.

Additionally, the virtual reality headset 10 may be part of an amusement park attraction 46 that includes a ride vehicle 42. The ride vehicle 42 may be maneuvered to correspond with the images projected by the virtual reality headset 10 according to the methods discussed above for displaying images on the lenses of the virtual reality headset 10.

Figure 6:
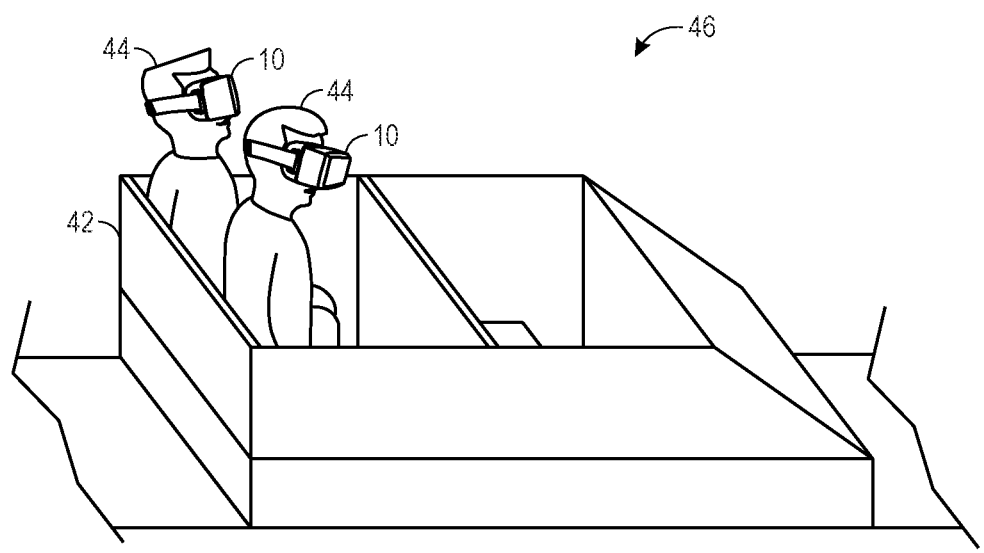
FIG. 6 is a perspective view of an embodiment of a ride vehicle that may carry a user while the user wears the virtual reality headset, in accordance with embodiments of the present disclosure.

With the foregoing in mind, FIG. 6 is a perspective view of an embodiment of a ride vehicle 42 and one or more users 44 that each may utilize a respective virtual reality headset 10 in an amusement park attraction 46. As set forth above, the primary screen 30 and/or the secondary screens 32 may be configured to display images to the user 44 of the virtual reality headset 10 such that the one or more users 44 may view the images (e.g., video feed) during movement of the ride vehicle 42. In the illustrated embodiment, each user 44 of the amusement park attraction 46 has a respective virtual reality headset 10 to view the images. The controllers of the virtual reality headsets 10 may be configured to send a command to each primary screen 30 and/or the secondary screens to output the same images to each optical element 14, such that a common video feed is viewable for each user 44. However, in an embodiment, the images may be different for each virtual reality headset 10 such that each user 44 may view unique images (e.g., unique video feed). For example, each user 44 may be assigned a specific role (e.g., captain, pilot, navigator) as part of the amusement park attraction 46. The respective virtual reality headset of each user 44 may display a video feed specific to the specific role assigned to the user 44 such that the user 44 may experience the amusement park attraction 46 from a perspective of their assigned role.

In an embodiment, the virtual reality headset 10 may be configured to output a combination of both the common feed and unique video feeds within the amusement park attraction 46. For example, the virtual reality headset 10 may display the common feed during an introductory portion of the amusement park attraction 46. During later portions of the amusement park attraction 46, the controller of each of the virtual reality headsets 10 may send a command to the primary screen 30 and/or the secondary screens to output unique video feeds to users 44 (e.g., associated with specific roles). The users 44 without roles or the users 44 with roles that do not have active tasks may continue to receive the common feed. However, during some portions of the amusement park attraction 46, the virtual reality headset 10 may output unique video feeds to each user 44 of the amusement park attraction 46. Additionally, in an embodiment the virtual reality headsets 10 may receive commands to display certain images and/or video feeds from a central controller that may be programmed to send commands to correspond to ride vehicle 42 motion and/or other effects of the amusement park attraction 46.

In an embodiment, the image includes a text-based message, a picture, a video, or some combination thereof. For example, the amusement park attraction 46 may be a virtual reality type attraction such that the images include video images of the virtual reality environment. In another example, the image may include text-based instructions for the amusement park attraction 46. The text-based instructions may inform the user 44 on how to use the virtual reality headset 10 and/or perform actions as part of the amusement park attraction 46.

While only certain features have been illustrated and described herein, many modifications and changes will occur to those skilled in the art. It is, therefore, to be understood that the appended claims are intended to cover all such modifications and changes as fall within the true spirit of the invention. While certain disclosed embodiments have been disclosed in the context of amusement or theme parks, it should be understood that certain embodiments may also relate to other uses. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A virtual reality headset, comprising:
a housing;
a primary display screen supported within the housing and configured to display primary images;
a secondary display screen supported within the housing and configured to display secondary images; and
an optical element that comprises a primary optical area formed from a first material and a peripheral optical area formed from a second material, wherein the primary optical area enables viewing of the primary images displayed on the primary display screen, the peripheral optical area enables viewing of the secondary images displayed on the secondary display screen, the first material and the second material have different optical properties, and the second material is translucent.

2. The virtual reality headset of claim 1, comprising a textured edge around at least a portion of the primary optical area.

3. The virtual reality headset of claim 2, wherein the textured edge separates the primary optical area from the peripheral optical area.

4. The virtual reality headset of claim 1, wherein the primary images comprise high-definition images, and the secondary images comprise low-definition images.

5. The virtual reality headset of claim 1, wherein the peripheral optical area comprises a left peripheral optical area on a left side of the virtual reality headset and a right peripheral optical area on a right side of the virtual reality headset.

6. The virtual reality headset of claim 1, wherein the first material is transparent.

7. The virtual reality headset of claim 1, wherein the primary optical area comprises polymethyl methacrylate (PMMA) or another optically clear material comprising an optical transmittal percentage of at least 85 percent.

8. The virtual reality headset of claim 1, wherein the peripheral optical area comprises one or more sensors, speakers, light-emitting diodes, or any combination thereof.

9. The virtual reality headset of claim 1, wherein the primary display screen and the secondary display screen form a single display screen.

10. The virtual reality headset of claim 1, wherein the peripheral optical area comprises a translucent film, and the virtual reality headset comprises an electrical circuit that is configured to deliver an electrical current through the translucent film to adjust opacity of the peripheral optical area.

11. A virtual reality headset, comprising:
a housing;
a primary display screen supported within the housing and configured to display primary images;
a secondary display screen supported within the housing and configured to display secondary images; and
an optical element comprising a primary optical area and a peripheral optical area, wherein the primary optical area is positioned to align with the primary display screen and is transparent, and the peripheral optical area is positioned to align with the secondary display screen and is translucent.

12. The virtual reality headset of claim 11, wherein the primary display screen comprises a high-definition display, and the secondary display screen comprises a low-resolution display.

13. The virtual reality headset of claim 11, wherein the peripheral optical area is translucent due to a translucent base material, a surface texture, a coating, or any combination thereof.

14. The virtual reality headset of claim 11, wherein the peripheral optical area is translucent due to an electrically-activated film.

15. The virtual reality headset of claim 11, wherein the peripheral optical area comprises a left peripheral lens area on a left lateral side of the virtual reality headset and a right peripheral lens area on a right lateral side of the virtual reality headset.

16. The virtual reality headset of claim 11, wherein the primary display screen and the secondary display screen form a single display screen.

17. A method of operating a virtual reality headset, the method comprising:
displaying primary images on a primary display screen positioned in front of a transparent primary lens area of the virtual reality headset from a viewer perspective;

displaying secondary images on a secondary display screen positioned in front of a translucent peripheral lens area of the virtual reality headset from the viewer perspective; and coordinating, via one or more processors, the displaying of the primary images and the displaying of the secondary images to create a virtual environment with peripheral vision effects.

18. The method of claim 17, wherein displaying the primary images comprises displaying the primary images in high-definition, and displaying the secondary images comprises displaying the secondary images in low-definition.

19. The method of claim 17, comprising displaying additional secondary images on an additional secondary display screen positioned in front of an additional translucent peripheral lens area of the virtual reality headset.

20. The method of claim 19, comprising coordinating, via the one or more processors, the displaying of the primary images, the displaying of the secondary images, and the displaying of the additional secondary images to create the virtual environment with peripheral vision effects.

* * * * *